Oct. 15, 1968  W. J. VAN DER MEER  3,405,496
PANEL STRUCTURAL COMPONENTS
FOR BUILDING CONSTRUCTION
Filed Oct. 20, 1965  3 Sheets-Sheet 1
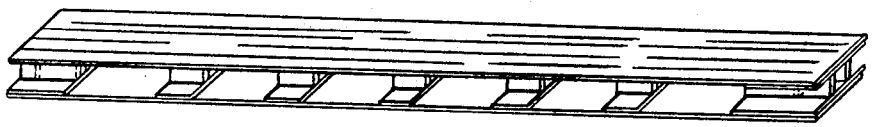
FIG.1
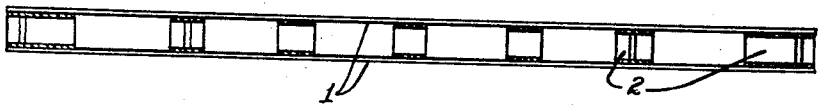
FIG.2
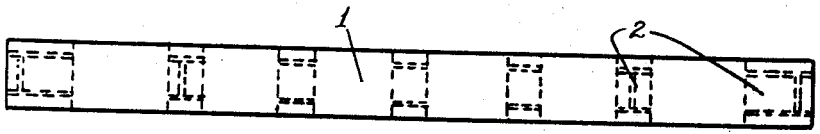
FIG.3
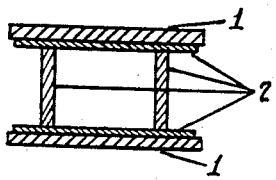 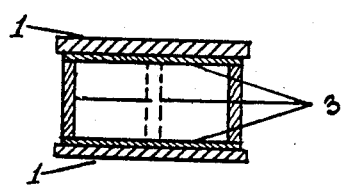
FIG.4  FIG.5
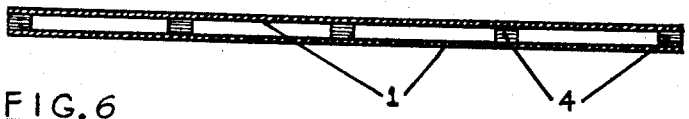 
FIG.6  FIG.7
Inventor
Wybe J. van der Meer
By Pierce, Scheffler & Parker
his Attorneys Oct. 15, 1968  W. J. VAN DER MEER  3,405,496
PANEL STRUCTURAL COMPONENTS
FOR BUILDING CONSTRUCTION
Filed Oct. 20, 1965  3 Sheets-Sheet 2
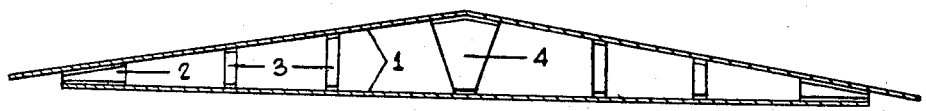
F I G. 8
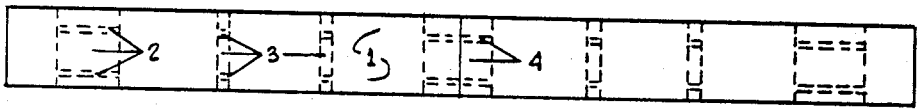
F I G. 9
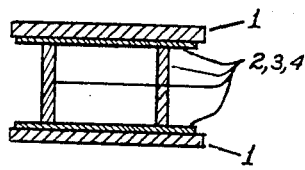 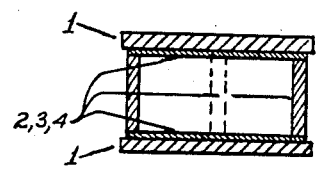
F I G. 10    F I G. 11
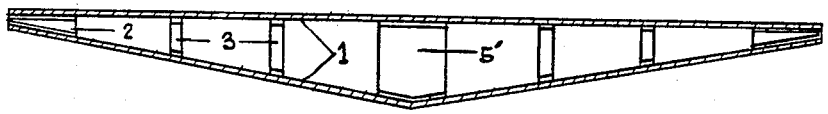
F I G. 12
Inventor
Wybe J. van der Meer
By Pierce, Scheffler & Parker
his Attorneys United States Patent Office
3,405,496
Patented Oct. 15, 1968

3,405,496
PANEL STRUCTURAL COMPONENTS FOR
BUILDING CONSTRUCTION
Wybe J. van der Meer, Albuquerque, N. Mex., assignor to Intermountain Lumber Company, Missoula, Mont., a corporation of Montana
Filed Oct. 20, 1965, Ser. No. 498,390
4 Claims. (Cl. 52—615)

ABSTRACT OF THE DISCLOSURE

The structural building panel of the present invention comprising a first skin and a second skin orientated in spaced relation, and a plurality of separate spacers secured to and spacing said skins, said panel being characterized in that none of the spacers is a continuous load-bearing member, said skins alone taking all stresses.

My invention concerns panel components to be used in a structural capacity for load bearing walls, floor construction, and/or roof construction for buildings or any type of miscellaneous structure for which their shape and strength would be suitable. All of the panel components have in common a single idea, which is to take full structural advantage of materials normally used as covering only and eliminate continuous load bearing or stress carrying members interior to the panel itself such as studs, rafters, joists, or continuous web like truss members. It is to be noted that while the spacer assemblies shown on some of the accompanying drawings may in themselves appear similar to some form of hollow box girders they are not continuous and, therefore, do not act in a fashion similar to hollow box girders, but instead serve to separate and connect coverings to maintain the appropriate geometric shape, thereby allowing the coverings (hereinafter called skins) to develop their structural capacity in resisting the stresses developed under loaded conditions. While the following descriptions and accompanying drawings are oriented particularly towards the use of lumber materials for the skins and the spacer assemblies, other materials such as plywood, composition wood materials, rigid plastics, or metals could also be used depending upon the stresses involved and their suitability to resist the involved stresses.

In addition to using materials in a stress carrying capacity which are not normally so used and thereby allowing a reduction in the amount of materials used for construction, the panel component system reduces the amount of construction time by eliminating many of the on-the-site processes normally required by conventional construction. These particular panel components of my invention also allow for an integrated mechanical and electrical system by providing space in the interior of the panels so that these items may pass in any direction without conflict with the structural members, thereby maintaining structural integrity without requiring additional structural provisions. The suitability of these structural panel components to perform their intended functions has been demonstrated by tests on prototype models conducted under my supervision.

My invention is illustrated in the accompanying drawing. For simplicity of description the members in the accompanying drawing and described herein shall be considered to be constructed of lumber materials. It is to be understood, however, that the basic concepts of these panel components also lend themselves to the use of other suitable materials as stated hereinabove. The connection methods described herein for attachment of skins to spacer assemblies will also be oriented toward the use of lumber materials. If materials other than lumber components are used in the fabrication of these structural panels connection methods suitable to the materials used must be employed: attachments for metal products could employ welds, bolts, rivets or combinations thereof, attachments for plastic materials could employ catalyst welds, glue, or mechanical fasteners such as screws, bolts, etc., depending upon the nature of the plastic involved, attachments for composition wood products could be made through the use of glue, bolts, screws or other mechanical attachments as required.

The invention will now be described in greater detail and with reference to the appended drawings, in which:

FIG. 1 is a oblique view of a panel according to the present invention, the same being drawn to give a better pictorial representation of the panel;

FIG. 2 is a longitudinal cross-sectional view of the panel shown in FIG. 1;

FIG. 3 is a top view of the panel;

FIG. 4 is a transverse cross-sectional view of the panel showing structural skins and spacer assemblies;

FIG. 5 is a further transverse cross-sectional view indicating an alternative method of constructing the spacer assemblies;

FIG. 6 is a longitudinal section of a floor panel;

FIG. 7 is a transverse sectional view of the panel shown in FIG. 6;

FIG. 8 is a longitudinal cross-sectional view of the panel having sloping top or bottom structural skins;

FIG. 9 is a top view of the panel shown in FIG. 8;

FIGS. 10 and 11 are transverse cross-sectional views showing alternate spacer assembly types;

FIG. 12 is a structure inverse to that in FIG. 8;

Figure 13:
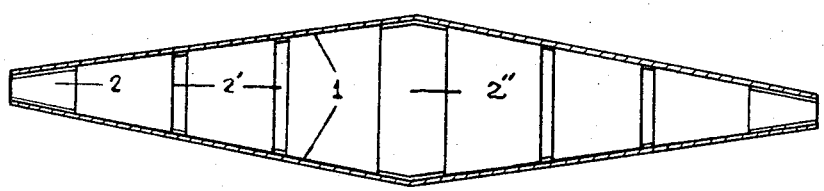
FIG. 13 is a longitudinal cross-section of a structural panel according to the invention.

*Roof and floor panels (horizontal top and bottom skins)*

FIG. 1 is an oblique view of the panel drawn to give a better pictorial representation of the panel.

FIG. 2 is a longitudinal cross-sectional view of the panel. Item 1 represents the structural skins of the panel. Item 2 represents the spacer assemblies. The structural skins (item 1) are attached to the spacer assemblies (item 2) by high strength, high heat-resisting, glue, either waterproof or water-resistant as the use requires. Bolts, screws or other mechanical fasteners may be used in conjunction with the glue to secure the structural skins to the spacer assemblies when spans and loading conditions produce stresses which warrant such additional devices. When materials other than lumber products are used connection methods appropriate to the materials used must be employed as previously stated. The length, height and distance between spacer assemblies shall be governed by the span lengths and intended loading conditions so as to keep the stresses in the structural skins within acceptable limits and deflection of the panels to an allowable minimum for the intended use.

FIG. 3 is a top view panel. The width of the panel may vary to fit a suitable module for the materials used. The dashed lines shown on FIG. 3 represent the spacer assemblies, item 2.

FIG. 4 is a transverse cross sectional view of the panel showing the structural skins and spacer assemblies.

FIG. 5 is also a transverse cross sectional view indicating an alternate method of constructing the spacer assemblies. Additional vertical members may be used as shown in dotted lines when shear and loading conditions warrant it. It is to be noted that for both types of spacer assemblies the size and thickness of the components comprising the spacer assemblies can vary to suit the required conditions. The spacer assemblies can be preformed and assembled with glue or a combination of glue and mechanical fasteners as necessary.

FIG. 6 is a longitudinal section of a floor panel suitable for shorter spans and using solid spacer assemblies.

FIG. 7 is a transverse sectional view relating to FIG. 6.

When solid lumber material is used for the structural skins, such material may be tongue and groove, patterned or unpatterned, to facilitate connections between adjacent panels and provide a decorative ceiling or roof structure when left exposed. When span lengths of the panels require greater than standard lengths of lumber for the structural skins, the lumber material may be end-matched and end-glued with the splices occurring in adjacent boards to be staggered.

*Roof and floor panels (sloping top or bottom structural skins)*

FIG. 8 is a longitudinal cross section view of the panel. Item 1 represents the structural skins, items 2, 2', and 2" represent the spacer assemblies. The thickness of the skins, and the size, length, and height of the spacer assemblies are determined in accord with the stresses produced by the length of span and loading conditions and the desired pitch for the sloping skin. The attachment of the skins to the spacer assemblies is accomplished in the manner similar to that described for the roof and floor panels disclosed in FIGS. 2-7 inclusive. A panel such as that shown in FIG. 8 may be used for roof purposes and its inverse, shown in FIG. 12, may be used for either roof or floor purposes. Under either condition these panels may be supported at the extreme ends with the clear span determined by the panel length, or may be supported at the center with each side, therefor, acting as a cantilever structure.

FIG. 9 is a top view of the structural panel. The width of the panel may vary to suit a module of the material used.

FIGS. 10 and 11 are transverse cross sectional views showing alternate spacer assembly types. The comments made pertaining to the spacer assemblies discussed with reference to FIGS. 1-7 inclusive are applicable to these spacer assemblies.

FIG. 12 has been described along with FIG. 8. Item 5' of FIG. 12 is an alternative design of the spacer assembly at the ridge.

The comments made at the end of the description for the panel shown in FIGS. 1-7, pertaining to the materials for the structural skins, the lengths and splicing of the material of the structural skins, and the method of joining adjacent panels, all apply to the panels illustrated in FIGS. 8-12 inclusive.

*Roof panels (sloping top and bottom skins or curved panels)*

To avoid needless duplication of descriptive information, it can be here stated that all comments pertaining to size, lengths, thicknesses of the skins and spacer assemblies made pertaining to the panels shown in FIGS. 1-12, pertain also to the panels shown in FIGS. 13-16 inclusive, as do also the comments pertaining to the distances between spacer assemblies and the attachment of the skins to the spacer assemblies.

FIG. 13 is a longitudinal cross section of the structural panel. Item 1 represents the structural skins, items 2, 2' and 2" represent the spacer assemblies. The cross sectional views of the spacer assemblies are identical to FIGS. 10 and 11. Pitch of the top and bottom skins may be as desired for aesthetic reasons or as required by structural considerations.

Figure 14:
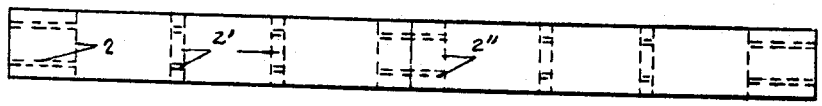
FIG. 14 is a top view of the panel shown in FIG. 13.

FIG. 14 is a top view of the structural panel. The width of the panel may vary to suit a desirable module for the material used.

Figure 15:
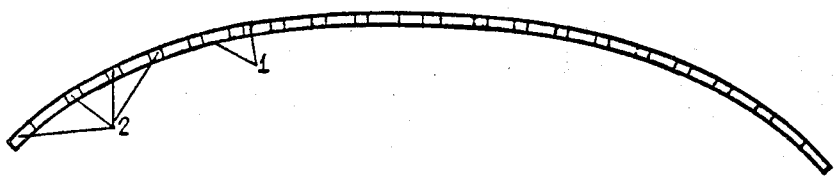
FIG. 15 is a longitudinal cross-section of a structural skin curved panel.

FIG. 15 is a longitudinal cross sectional view of a structural skin curved panel. The curve may be a parabolic curve, catenary curve, elliptical curve, or segment of a circular curve as required for aesthetic purposes or as determined by loading conditions. The height-to-span ratio of the curved panels may also vary depending upon the aforementioned conditions. While drawing of FIG. 15 represents parallel top and bottom curved skins, the depth of the member need not be constant as shown but can vary if conditions so warrant. The curved panel may be constructed in a single piece and erected as a two-hinged arch, or it may be constructed in halves and erected as a three-hinged arch. Provisions must be made to resist the horizontal thrust at the ends of the panels under loaded conditions, such provisions being accomplished by the use of stable abutments, tie rods, or any other suitable device.

Figure 16:
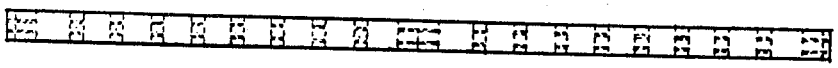
FIG. 16 is a top view of the curved panel shown in FIG. 15.

FIG. 16 is a top view of the curved panel. The width of the panel may vary to suit a desirable module for the material used. The spacer assemblies may be similar in cross section to either FIG. 4 or FIG. 5, or solid spacers as shown in FIG. 6 (item #4), the only difference being that the vertical members of the spacer assemblies and the horizontal members attached thereto will be curved to suit the required curve for the structural skins. This aspect of the spacer assemblies is shown in FIG. 15.

I claim:

1. A structural roof or floor building panel comprising a first skin and a second skin orientated in spaced relation in any developable surface configuration for the skins, and a plurality of separate spacers placed in spaced relation to each other and secured to and spacing said skins, said skins and spacers constituting a unitary whole panel, each of said skins being comprised of contiguous pieces of sheet material, each of said spacers being a built-up structure including a first spacing component adjacent one of said skins and a second spacing component adjacent the other of said skins, each of said first and second spacing components being formed from sheet material and having major plane faces and straight edges, said first and second spacing components being interconnected by a plurality of parallel transverse members of sheet material placed parallel to the major axis of the panel and with opposed edges of the transverse members being parallel to and secured to opposed faces of said first and second spacing components, said first and second spacing components being secured to said skins in surface to surface engagement and inset from the edges of said skins, said spacers being so constructed and arranged within the panel as to provide continuous openings in both directions within the panel and also in the interior space between panels when two or more panels are placed adjacent to each other.

2. The building panel defined in claim 1, in which the first and second skins lie in planes at an angle to each other.

3. The building panel defined in claim 1 wherein said first and second skins are parallel.

4. The building panel defined in claim 3, in which the first and second skins develop curved surfaces.

(References on following page)

References Cited

UNITED STATES PATENTS

| | | | |
|---|---|---|---|
| Re. 23,693 | 8/1953 | Bergvall et al. | 52—731 |
| 1,236,635 | 8/1917 | Wells | 52—92 |
| 1,486,541 | 3/1924 | Ottosson-Elliot et al. | 52—580 |
| 1,991,145 | 2/1935 | Fuchs et al. | 52—586 |
| 2,347,879 | 5/1944 | Brunton et al. | 52—90 X |
| 2,648,877 | 8/1953 | Vermilya | 52—92 |

FOREIGN PATENTS

| | | |
|---|---|---|
| 949,477 | 2/1949 | France. |
| 988,500 | 5/1951 | France. |
| 1,002,434 | 10/1951 | France. |
| 665,850 | 1/1952 | Great Britain. |

FRANK L. ABBOTT, *Primary Examiner.*

ALFRED C. PERHAM, *Assistant Examiner.*